No. 847,019. PATENTED MAR. 12, 1907.
P. F. E. MAGNIEZ.
MACHINE FOR PREPARING CHOCOLATE ICING.
APPLICATION FILED JULY 12, 1904.
5 SHEETS—SHEET 5.
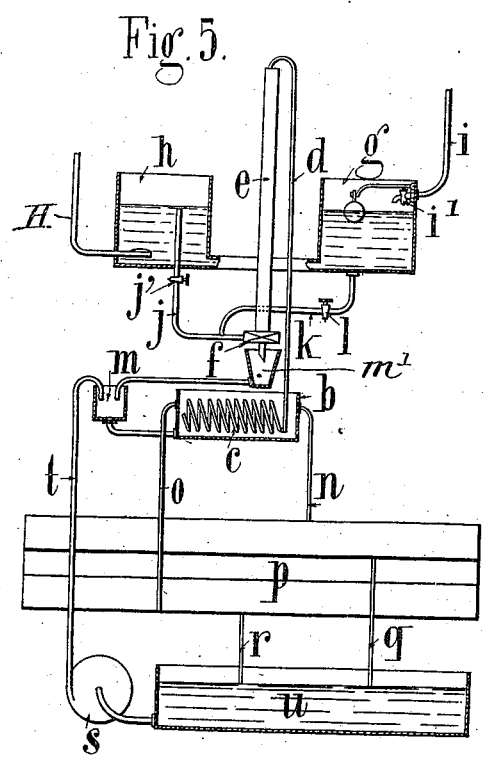
WITNESSES:
INVENTOR
Paul Frédéric Ernest Magniez
BY
ATTORNEYS.

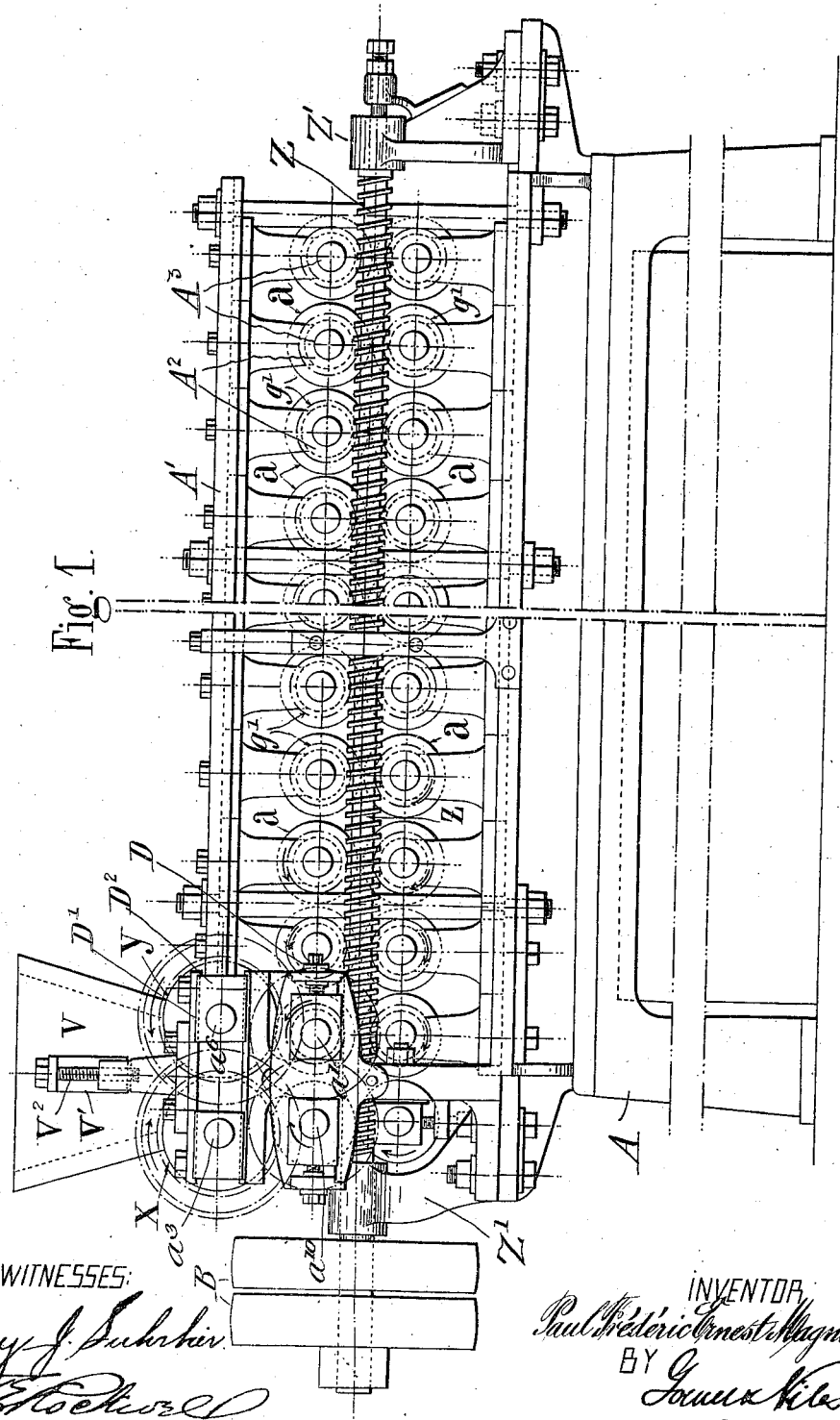

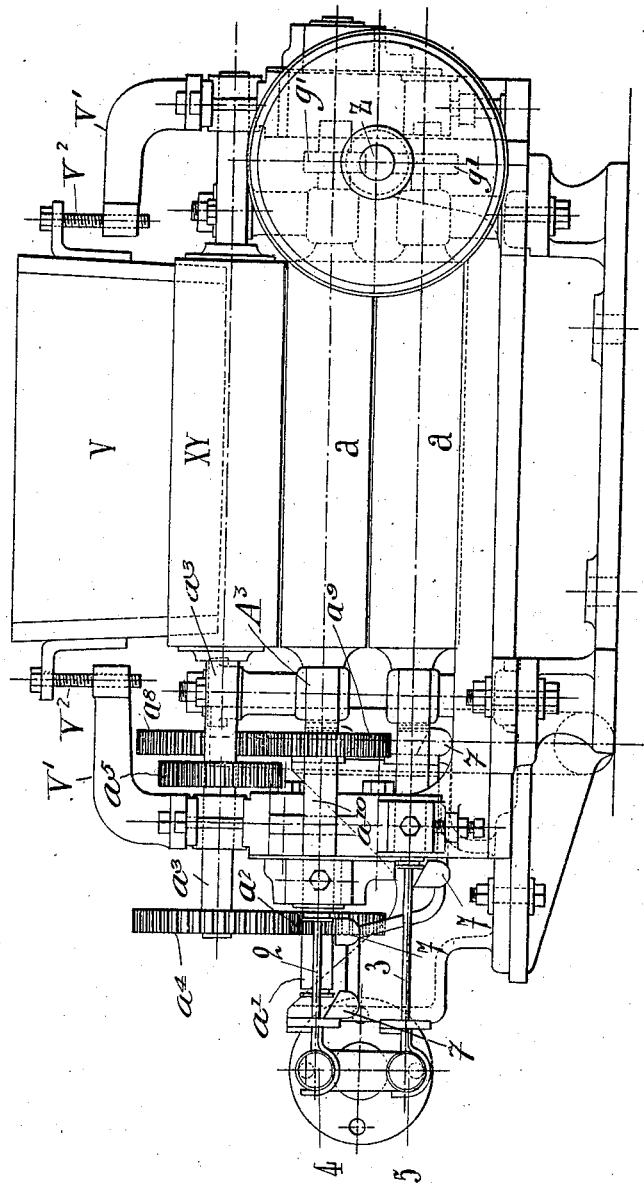

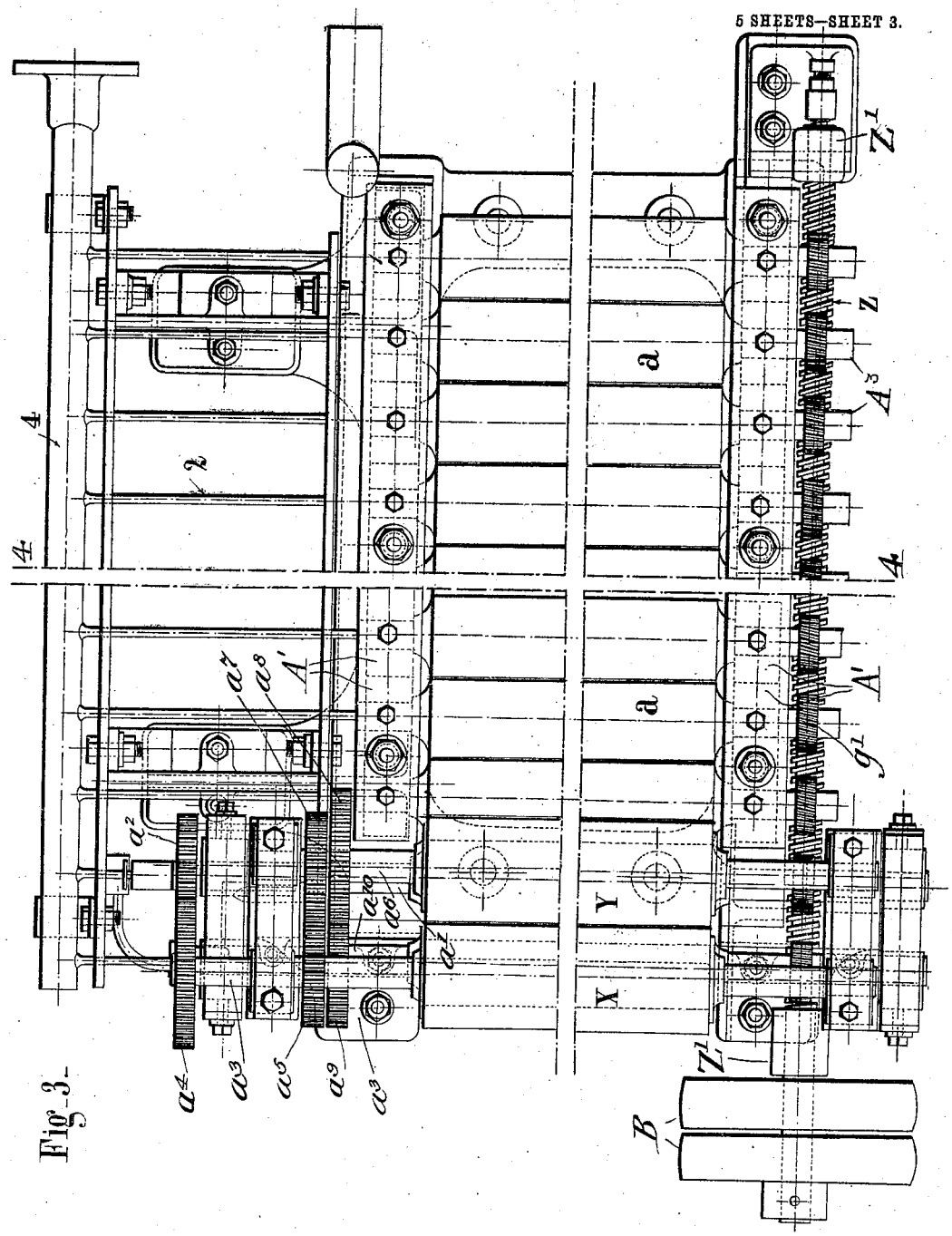

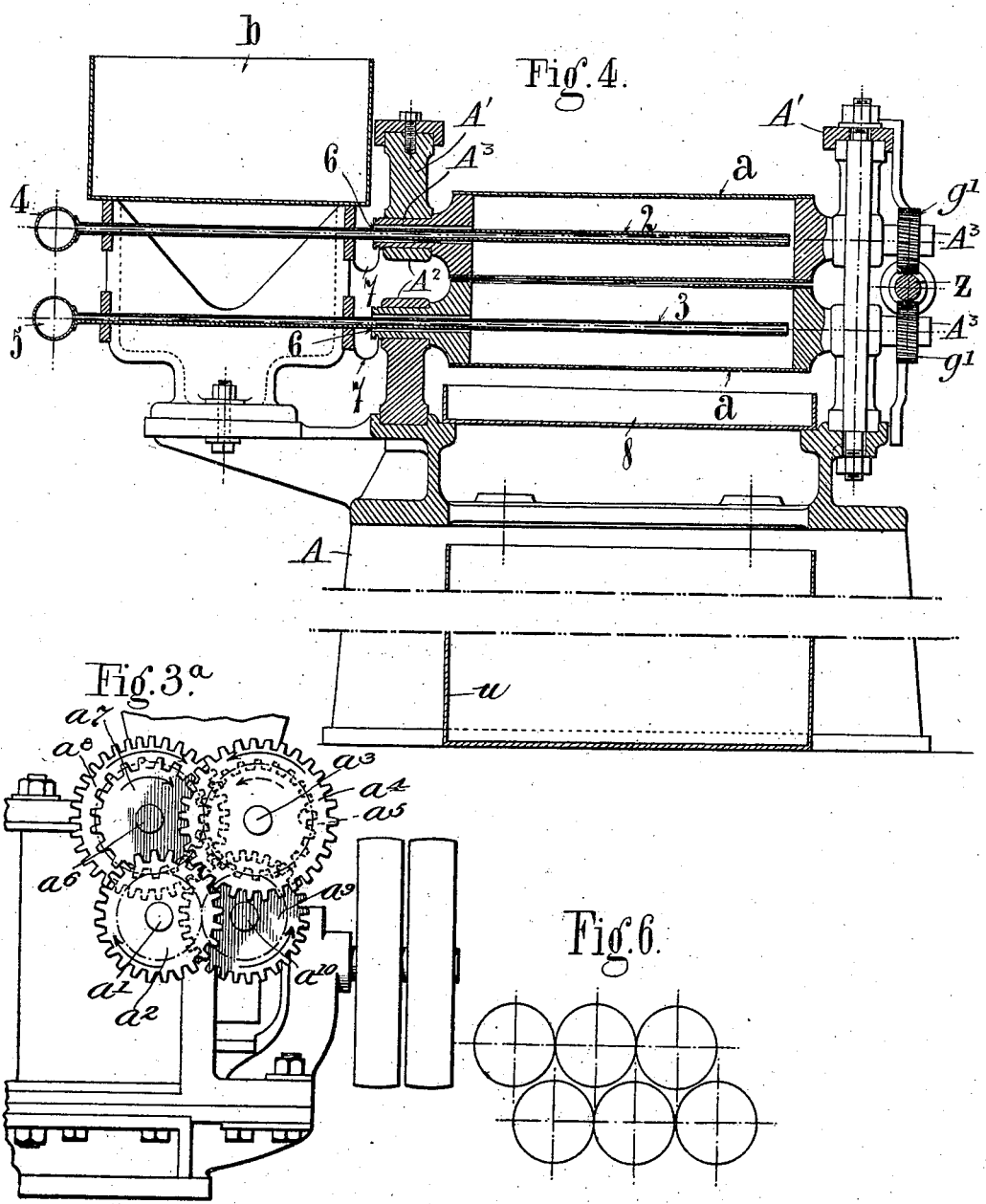

UNITED STATES PATENT OFFICE.

PAUL FREDERIC ERNEST MAGNIEZ, OF AMIENS, FRANCE.

MACHINE FOR PREPARING CHOCOLATE ICING.

No. 847,019.     Specification of Letters Patent.     Patented March 12, 1907.

Application filed July 12, 1904. Serial No. 216,253.

*To all whom it may concern:*

Be it known that I, PAUL FREDERIC ERNEST MAGNIEZ, a citizen of the Republic of France, residing at Amiens, in said Republic, have invented certain new and useful Improvements in Machines for Preparing of Chocolate Icing, of which the following is a specification.

This invention relates to a machine for preparing chocolate paste or icing for coating confectionery.

The object of the invention is to provide a machine which effects the thorough working of the paste or icing and which embodies means for obtaining in a constant and uniform manner the proper temperature for bringing about a rational contraction of cocoa-butter, and consequently of all pastes, chocolates, coatings, and the like, into the composition of which the substance in question enters.

A further object of the inventon is to furnish an improved arrangement of the rollers between which the material is kneaded and also to furnish improved mechanism for operating said rollers.

The invention also purposes the provision of improved means to feed the material to the kneading-rollers.

With these ends in view the invention consists in the novel features of construction, arrangements, and combinations of parts to be hereinafter described and finally recited in the claims.

In the accompanying drawings, in which the same parts are denoted by the same reference characters throughout the several views, Figure 1 is a front elevation of a machine constructed in accordance with the invention. Fig. 2 is an end view from the end where the paste is introduced. Fig. 3 is a plan view of the machine. Fig. 3ª is a detail elevation of the gearing between the feed-rollers and certain of the kneading-rollers. Fig. 4 is a vertical transverse section on line 4 4, Fig. 3. Fig. 5 shows diagrammatically the device regulating the temperature of the fluid which is distributed to and regulates the temperature of the kneading and heating rollers, and Fig. 6 shows diagrammatically a modified arrangement of the kneading and heating rollers.

Referring to the drawings, A denotes the frame of the improved machine, and A' side frames supported on and extending upwardly from the frame A.

$A^2$ denotes a plurality of bearings of which each side frame is provided with two horizontal longitudinal rows, and $A^3$ denotes shafts which are journaled in said bearings and which carry rollers $a$, extending between the side frames, A large number of rollers $a$ is arranged side by side, being superposed in pairs or groups of two, as shown in Fig. 1. The rollers may also be arranged in staggered relation, as shown in Fig. 6, the essential feature of either of the arrangements being that the rollers of each horizontal row are in such close proximity to each other as to be substantially in contact, and thereby prevent the escape of paste outside of the inner circuit formed by the space existing between the upper and lower rows of rollers. The shafts $A^3$ of the rollers $a$ are provided at one end with worm-wheels $g'$, all of which are engaged by a worm-spindle Z, extending throughout the length of the machine. This spindle is supported at its ends by supports Z' and provided at one end with driving-pulleys B, which by means of suitable transmission mechanism serve to rotate said worm-spindle. The worm-gears $g'$ are of such size and form that the upper and lower rollers are rotated at the same speed, but in opposite direction. The rollers of each row are rotated in the same direction, but oppositely to the rollers of the other row.

The material to be operated upon is introduced between the last two groups of rollers at one end of the machine, the shafts of the upper rollers in said groups being denoted by reference characters $a'$ $a^{10}$. The lower rollers of said groups are rotated by the worm-spindle Z in the manner already described, as is also the roller having the shaft $a'$; but the end roller of the upper row having the shaft $a^{10}$ is not provided with a worm-gear, but is rotated in a manner and direction to be hereinafter described.

The upper rollers of the first two groups are laterally adjustable in order to regulate the amount of material fed between the same, this adjustment being accomplished by means of screws D. The end roller of the upper row, instead of being spaced upwardly from its corresponding roller of the lower row, rotates in contact therewith in order to retain the material within the space defined between the upper and lower rows of rollers.

Arranged above the two upper rollers of the first two groups are larger feed-rollers X Y, the shafts $a^3$ $a^6$ of which extend beyond both side frames. Said feed-rollers rotate in bearings $D^2$, which are movable in guideways D'. A hopper V is supported above the feed-rollers by means of brackets V' and may be adjusted in vertical direction by means of screws $V^2$. It is obvious that the material placed in said hopper is fed downwardly thereby between the feed-rollers X Y, which in turn assist in its introduction between the first two groups of rollers $a$.

It is obvious that the end roller of the upper row having the shaft $a^{10}$ must be rotated oppositely to its adjacent roller in the same row in order to produce the downward feeding of the material between said rollers, and consequently said roller cannot be rotated by the worm-spindle which effects the rotation of all the other rollers with the exception of the feed-rollers. This roller and the feed-rollers are rotated from the upper roller of the second group, having the shaft $a'$, in the following manner: The shaft $a'$ is extended at one end beyond one side frame of the machine and has keyed thereto at its extreme end a gear-wheel $a^2$, as shown in Figs. 2, 3, and $3^a$. Said gear-wheel meshes with a gear-wheel $a^4$, carried by the shaft $a^3$ of the feed-roller X at the extreme end of said shaft. By this means motion is transmitted to said feed-roller in the direction shown by the arrow in Fig. 1. The shaft $a^3$ has also mounted thereon a gear-wheel $a^5$, which meshes with a gear-wheel $a^7$, carried upon the shaft $a^6$ of the feed-roller Y, whereby the rotation of said last-named feed-roller in a direction opposite to that of the roller X is obtained. The shaft $a^6$ of the feed-roller Y is further provided with a gear-wheel $a^8$, and said gear-wheel meshes with a gear-wheel $a^9$, carried by the shaft $a^{10}$ of the upper roller of the first group. Consequently the feed-roller X is rotated through the upper roller of the second group, the feed-roller Y by means of the feed-roller X, and the upper roller of the first group through said feed-roller Y. The size of the gear-wheels employed is such that the upper roller of the first group rotates at the same speed at which the other rollers actuated from the worm-spindle rotate. Inasmuch as the upper roller of the first group rotates in contact with but oppositely from the lower roller of said group, the material is effectually prevented from passing out between said rollers.

Each of the rollers $a$ is hollow, as shown in Fig. 4, and constructed of metal or suitable material capable of easily transmitting heat or cold produced in the interior of the rollers by any thermic agent. The shafts at one end of the rollers $a$ are provided with bores or orifices 6. Pipes 2 and 3 of less diameter than said orifices are disposed within said orifices and lead into the hollow rollers, as shown in Fig. 4. The pipes 2, leading to the upper row of rollers, are connected with a distributing-pipe 4, while the pipes 3, which lead to the lower row, are supplied with the thermic medium through a distributing-pipe 5. The water or other thermic agent, after being supplied to the hollow rollers by means of the pipes 2 and 3, passes out of said rollers through the openings 6, from which it is conducted, by means of gutters 7, to a vat $u$, arranged within the frame A below the rollers, as shown in Fig. 4.

The water is preferably used for maintaining the rollers $a$ at the proper temperature, and the temperature of this water is preferably controlled by the device diagrammatically illustrated in Fig. 5. This device consists of a vessel or vat $b$, in which is arranged a coil $c$, connected by a thin pipe $d$ with the governor $e$ of a valve $f$. This valve controls the supply of water passing from the vessel or vat $b$. The temperature of the water in the vat $b$ is determined by means of the governor $e$, and the temperature of the water entering the rollers $a$ is accordingly regulated. To accomplish this purpose, two reservoirs $g$ and $h$, communicating with each other at the bottom, are provided, the level of the liquid in the reservoirs being maintained automatically by means of a float-valve $i'$, adapted to close or open an inlet-pipe $i$ for supplying the reservoir $g$ with cold water. The water in these reservoirs can be raised to a certain temperature exceeding that of the water circulating in the machine by injecting steam into the reservoir $h$ by means of a pipe H. The reservoir $g$ is connected with a pipe $k$, having a tap $l$, and the reservoir $h$ is provided with a pipe $j$, having a tap $j'$, the pipes $k$ and $j$ joining near the valve $f$, which controls the temperature and the supply of water to the funnel $m'$ in communication with the funnel $m$, from which the water passes into the vessel or vat $b$ and then, by means of pipes $n$ and $o$, into the rollers $a$ of the machine $p$. By the proper manipulation of the hot-water tap $j'$ and cold-water tap $l$ the temperature may be changed as desired, the temperature of the water supplied to the rollers being always the temperature to which the valve $f$ is regulated.

The water passing out of the rollers through their openings 6 is conducted, by means of pipes $r$ and $q$, into the vat $u$ and from there transferred by a pump $s$ through a pipe $t$ into the funnel $m$, from which it passes again into the vessel or vat $b$ and mingles with the water supplied by the pipes $k$ and $j$.

In practice the paste is deposited in the hopper V, from which it is fed between the feed-rollers X and Y, and thence downwardly between the upper rollers of the first two groups of rollers $a$. By reason of the fact that the rollers of the lower row or series are arranged in very close proximity the paste is deflected into the space defined between the upper and lower series of rollers. The paste is then kneaded and thermally acted upon by said rollers while traversing the entire length of the machine, such paste being alternately divided and compressed between the successive groups of rollers until it passes out from the machine at the discharge end of the same. The rollers *a* are maintained at the proper temperature by the apparatus described, and consequently when the paste issues from the machine it has been thoroughly worked by the rollers to the proper consistency, and at the same time the proper contraction of the cocoa-butter within the paste has been effected.

Having thus described my invention, I claim as new and desire to secure by Letters Patent—

1. In a machine for preparing chocolate icing, the combination of two series of horizontal parallel rollers of which the adjacent rollers in each series are in such close proximity to each other as to be substantially in contact, said series opposing and being arranged one above the other, and means for rotating the rollers in each series in the same direction, but oppositely to the rollers in the other series.

2. In a machine for preparing chocolate icing, the combination of two series of parallel rollers of which the adjacent rollers in each series are in such close proximity to each other as to be substantially in contact, said series opposing and being arranged one above the other, means for rotating the rollers in each series in the same direction, but oppositely to the rollers in the other series, and means for feeding the material between two adjacent upper rollers at one end of the machine.

3. In a machine for preparing chocolate icing, in combination, superposed rows of horizontal rollers arranged in pairs composed of rollers of both rolls, the rollers in each row being in such close proximity to each other as to be substantially in contact, laterally-adjustable bearings for the upper rollers of two adjacent groups at one end of the machine, feed-rollers arranged above said last-named rollers, and a hopper above said feed-rollers.

4. In a machine for preparing chocolate icing, the combination, with opposing side frames, of horizontal rollers journaled in said side frames and arranged in a plurality of vertically-disposed pairs, worm-gears on the shafts of said rollers, and a worm-spindle engaging the worm-gears of both the upper and lower rollers.

5. The combination of two series of horizontal parallel rollers of which the adjacent rollers in each series are in such close proximity to each other as to be substantially in contact, said series being arranged in superposed relation, means for rotating the rollers in the lower series in one direction and the rollers of the upper series, with the exception of the end roller at the ingoing end of the machine, in the opposite direction, means for rotating said end roller of the upper series in a direction opposite to the rotation of the other rollers in said series, feed-rollers arranged above said end roller and the roller adjacent thereto, and a hopper above said feed-rollers.

6. In a machine for preparing chocolate icing, the combination of two superposed series of parallel rollers, a worm-spindle for rotating the rollers of each series in the same direction, but oppositely to the rollers in the other series, and gearing operated by said spindle to rotate the end roller of the upper series oppositely to the other rollers in said series.

7. In a machine for preparing chocolate icing, the combination of two superposed series of parallel rollers, worm-gears carried by the shafts of all said rollers except the end roller of the upper series, a worm-spindle engaging the worm-gears of the rollers in both series, and gearing operated from said worm-spindle for rotating said end roller oppositely to the other rollers in the same series.

8. In a machine for preparing chocolate icing, the combination of two superposed series of parallel rollers of which the adjacent rollers in each series are in close proximity, worm-gears mounted on the shafts of said rollers, a worm-spindle engaging the worm-gears of the rollers in both series and acting to rotate the rollers in each series in the same direction but oppositely to the rollers in the other series, feed-rollers arranged above the first two rollers of the upper series, and gearing operated from said worm-spindle for rotating the end roller of the upper series oppositely to the other rollers in the same series, and for rotating said feed-rollers.

In testimony whereof I have signed this specification in the presence of two subscribing witnesses.

PAUL FREDERIC ERNEST MAGNIEZ.

Witnesses:
EMILE LEDRET,
HANSON C. COXE.